United States Patent [19]

Harris, Jr.

[11] Patent Number: 4,549,790
[45] Date of Patent: Oct. 29, 1985

[54] MIRROR AND MOUNTING DEVICE

[75] Inventor: Richard J. Harris, Jr., Deer Park, Tex.

[73] Assignee: Spy Mirrors, Inc., Deer Park, Tex.

[21] Appl. No.: 614,966

[22] Filed: May 29, 1984

[51] Int. Cl.[4] .......................... G02B 17/06; G02B 7/18
[52] U.S. Cl. .................................... 350/624; 350/632; 248/477
[58] Field of Search ............... 350/624, 623, 618, 632, 350/631; 248/477, 476, 496, 495, 297.3

[56] References Cited

U.S. PATENT DOCUMENTS

| 167,585 | 8/1874 | Stephenson . |
| 419,549 | 1/1890 | Parker . |
| 531,257 | 12/1894 | Bond . |
| 715,038 | 12/1902 | Dunham . |
| 718,309 | 1/1926 | Brown . |
| 1,571,097 | 1/1926 | Redman . |
| 1,748,691 | 2/1930 | Zink . |
| 1,994,126 | 3/1935 | Eddy . |
| 2,251,592 | 8/1941 | Lowe . |
| 2,264,690 | 12/1941 | Gary . |
| 2,374,956 | 5/1945 | Rubissow . |
| 2,696,964 | 12/1954 | Ringwald . |
| 3,352,527 | 11/1967 | Merett . |
| 3,392,950 | 7/1968 | Pierce . |
| 3,408,136 | 10/1968 | Travis . |
| 3,481,574 | 12/1969 | Willaman . |
| 3,524,701 | 8/1970 | Strohmeier . |
| 3,533,681 | 10/1970 | Glaser . |
| 3,704,063 | 11/1972 | Guthrie ............................... 350/624 |
| 4,074,883 | 2/1978 | Daly et al. . |
| 4,151,757 | 4/1979 | Pitrat . |
| 4,151,971 | 4/1979 | Daly et al. . |
| 4,303,308 | 12/1981 | Kobrin . |

Primary Examiner—Jon W. Henry
Attorney, Agent, or Firm—Pravel, Gambrell, Hewitt & Kimball

[57] ABSTRACT

A rear viewing system allowing the driver to view occupants near the back of the bus comprises of a mirror resiliently mounted to a backing support member. The backing support member is attached to the back of the bus via two types of brackets. The first mounting bracket includes a mounting flange secured to the backing support member and an adjustable length L-shaped strut pivotally connected to the mounting flange and having a mounting surface adapted to be mounted flush to an interior wall of the bus. The second type of mounting bracket has two major components, a backing member strut and a securing strut. The backing member strut is essentially L-shaped as is the securing strut. The second mounting bracket is adjustable in that a fastener connects aligned openings in the backing member strut and securing strut.

13 Claims, 7 Drawing Figures

MIRROR AND MOUNTING DEVICE

FIELD OF THE INVENTION

This invention relates to rear view systems to allow a driver to observe the occupants in the rear of a bus. The rear view system allows a mirror to be mounted to a bus interior wall, subject to vibration, without distorting the images viewed in the mirror by the driver.

BACKGROUND OF THE INVENTION

In the past passenger buses, especially school buses, featured seats with relatively low backs which allowed the driver in the front of the bus to observe the occupants in every seat in the bus using a mirror mounted in the front of the bus. For safety reasons, newer busses and passenger vehicles now feature seats with raised seat backs so as to prevent neck injuries to occupants in the event of a collision. These new high-back seats, however, make it impossible for the driver to observe passengers seated toward the rear of the bus using an overhead mirror mounted over the windshield. It has been observed, especially in school buses, that when the occupants know the driver cannot observe their activities, vandalism such as destruction of the upholstery on the bus seats increases dramatically.

In the past, mirrors have been installed at the rear of the bus in an attempt to monitor occupant's activities and limit vandalism. Unfortunately, since the back of the bus is prone to substantial vibration forces transmitted from the engine and the suspension system, mirrors previously installed in the rear of buses have vibrated so much when the bus was in motion that the driver was unable to get a clear picture of the occupants seated in the rear. Accordingly, although the mirrors mounted in the bus may have been an initial psychological deterrent to vandalism, as soon as the occupants realized that the mirror mounted at the rear of the bus vibrated to such an extent as to prevent the driver from viewing their activities, the deterrent factor was lost. Accordingly, one of the objects of the invention is to provide a mounting system for a mirror to be mounted in the back of a bus which will significantly isolate the mirror from the vibrations of the bus body thereby allowing the driver a clear view of the occupants in the rear of the bus.

DESCRIPTION OF THE PRIOR ART

The most common way mirrors were supported in the prior art was to use a mounting system which had a pivoted connection on the center of a backing plate secured to a mirror. Typical of these mounting systems were U.S. Pat. Nos. 715,038; 419,549; 3,481,574; 3,392,950; 2,264,690; 3,533,681. Other mounting systems used in the prior art involved a frame around a mirror with a bracket attached to one end of the frame. Typical of these were U.S. Pat. No. 718,309; 1,571,097; 1,994,126. Still other designs involved a frame around a mirror with a through rod going through the frame parallel to the mirror surface. These designs were used for outside rear view mirrors and attached to a convenient point on the outer body of the vehicle adjacent the driver's seat. Typical of such mounting systems were U.S. Pat. Nos. 4,303,308; 3,408,136; 2,696,964 and 2,374,956. Other mounting systems allowed mirror adjustment via links that moved through slots wherein either the slots or the links were affixed to the mirror backing. Typical of such designs were U.S. Pat. Nos. 3,352,527; 1,748,691. A combination of mirrors including a windshield mirror and another mirror mounted outside the vehicle such as on an attached trailer was disclosed by U.S. Pat. No. 3,524,701. Finally, use of a rear view mirror mounted over a windshield to allow the driver to view the occupants in a vehicle was illustrated by U.S. Pat. No. 167,585.

SUMMARY OF THE INVENTION

The rear view system of the present invention allows a mirror to be mounted in the back of a bus which is effectively isolated from the vibration of the bus body thereby providing the driver a clear view of the passengers seated in the back of the bus even in buses having high back seats. The rear view system includes a convex mirror resiliently mounted to a backing support member. The backing support member is secured to the back of the bus using two types of mounting brackets. The first type includes a mounting flange secured to the backing support member with an L-shaped strut pivotally connected to one end of the mounting flange. The strut is adapted to be mounted flush against an interior surface of the bus. The second type of bracket is made in two pieces, a backing member strut and a securing strut. Serrated surfaces on the backing member strut and securing strut overlay each other and are secured together at selectively different positions with a fastener extending through an opening in the backing member strut and a slot in the securing strut. The preferred embodiment incorporates two mounting brackets having a pivotal connection at the top of the backing support member as well as an adjustable length and two adjustable length brackets employing the backing member strut and securing strut at the bottom of the backing support member. The securing strut is fixed to the interior wall of the bus.

DETAILED DESCRIPTION OF THE PREFERRED EMBODIMENT

Figure 1:
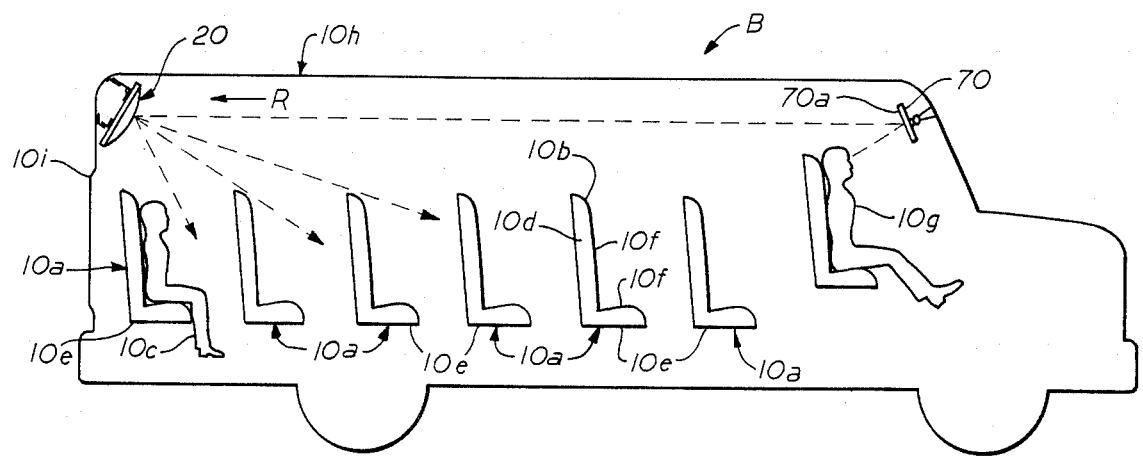
FIG. 1 is a sectional view of a bus equipped with a rear view system according to the present invention for viewing the occupants in the back of the bus.

As seen in FIG. 1 bus B has a plurality of seats 10*a* arranged one behind the other, typically in two rows (not shown) with an aisle in the middle (not shown). Seats 10*a* each have a high back portion 10*b*. High backs 10*b* on seats 10*a* are a recent phenomenon in bus construction and have primarily been employed in busses to reduce neck injuries to an occupant 10*c*.

Certain models of bus B have foam cushions 10*d* on the back 10*b* and the seating surface 10*e*. Cushion 10*d* is covered by a resilient material 10*f* which typically is a vinyl plastic.

The rear view system R of the present invention allows the bus driver 10*g* to have a clear view of the occupants 10*c* seated in the rear of the bus typically the last five rows of the bus B. The use of the rear view system R in bus B allows the driver 10*g* to observe occupants 10*c* to deter vandalism of the foam cushions 10*d* and resilient material 10*f*.

When the bus motor (not shown) is running the cantilevered rear end 10*h* of bus B is subject to significant vibration. The rear view system R of the present invention is specifically designed to compensate for such vibration and thus allow the driver 10*g* an unblurred view of the occupants 10*c* in the rear of bus B.

Figure 2:
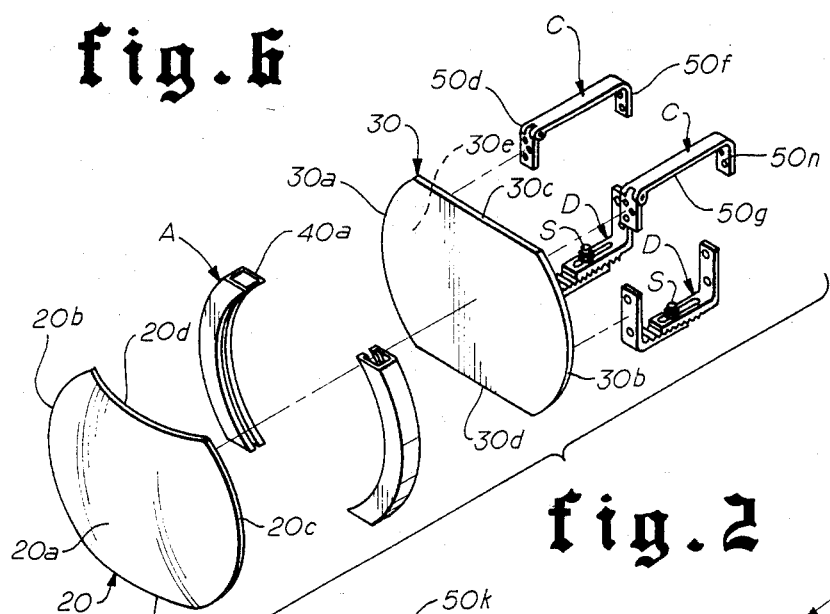
FIG. 2 is an exploded, isometric view of a portion of the support assembly of the system of the present invention.

As best seen in FIG. 2, the rear view system R comprises a mirror 20, a backing support member 30, attachment means A, mounting brackets C and mounting brackets D, and securing means S associated with mounting brackets D as will be more fully explained hereinbelow.

Mirror 20 has a convex reflective surface 20*a*. Although a convex reflective surface is preferred, a flat reflective surface may be employed without departing from the spirit of the invention. Mirror 20 has a pair of opposing arcuate edges 20*b* and 20*c*. Mirror 20 also has a pair of opposing straight edges 20*d* and 20*e*. Although edges 20*d* and 20*e* may actually be arcuate their projection onto backing support member 30 yields a straight line. The opposing straight edges 20*d* and 20*e* are aligned substantially parallel to the top of the rear exit door 10*i* (FIG. 1) of bus B. As seen in FIG. 2, the perpendicular distance between opposing straight edges 20*d* and 20*e* is smaller than the perpendicular distance between arcuate edges 20*b* and 20*c*. As a result, the vertical height of mirror 20, as defined by the perpendicular distance between opposing straight edges 20*d* and 20*e* is kept to a minimum without impairing the ability of the driver 10*g* to observe the occupants 10*c* seated in the rear of the bus 10*b*. By example and not by way of limitation the perpendicular distance between opposing straight edges 20*d* and 20*e* measured along reflective surface 20*a* can be eighteen inches while the maximum distance between arcuate edges 20*b* and 20*c* measured along reflective surface 20*a* is twenty-four inches. A properly aligned mirror 20 having such dimensions and mounted in the rear of bus B will typically allow the driver 10*g* to observe the occupants 10*c* in the last five rows of seats 10*a* in bus B.

Figure 6:
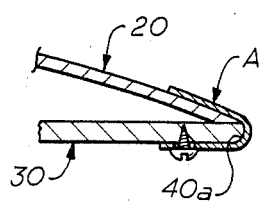
FIG. 6 is a sectional view of the backing support member of the system of the present invention illustrating the attachment between the mirror and the backing support member.
Figure 7:
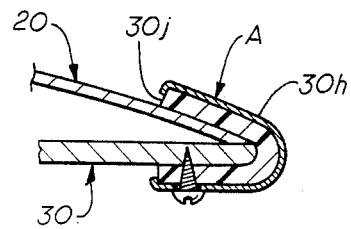
FIG. 7 is a sectional view of an alternative embodiment of the attachment between the backing support member and the mirror of the system of the present invention.

Referring to FIG. 2, it can be seen that backing support member 30 conforms to the perimeter of mirror 20 in that edges 30*a*, 30*b*, 30*c*, and 30*d* are aligned with edges 20*b*, 20*c*, 20*d*, and 20*e* of mirror 20, respectively. Mirror 20 is secured to backing support member 30 by attachment means A. As seen in FIG. 2, attachment means A is formed from a resilient material such as rubber. Attachment means A has a U-shaped cross-section, having the appearance of a channel member defining a continuous groove 40*a*. As seen in FIGS. 2, 6, and 7 the edges of backing support member 30 and mirror 20 are received in groove 40*a*. The resiliency of attachment means A provides vibration isolation between the mirror 20 and the vibrations of bus B.

As seen in FIG. 6, attachment means A can be formed from thin sheet metal having a cross section generally approximating the shape of a channel and defining a continuous groove 40*a* therein. A fastener 30*f* retains attachment means A to backing support member 30. As seen in FIG. 7 attachment means A includes a resilient U-shaped member 30*g* and a sheet metal or rigid plastic overlay 30*h* as a retainer. A fastener 30*i* retains member 30*g* and overlay 30*h* to backing support member 30. Attachment means A retains edge 30*a* against edge 20*b* and edge 30*b* against edge 20*c*. Alternatively, using a suitably constructed mirror 20 (not shown) attachment means A can be adapted to hold edge 30*c* against edge 20*d*; and edge 30*d* against edge 20*e*.

Figures 4, 5:
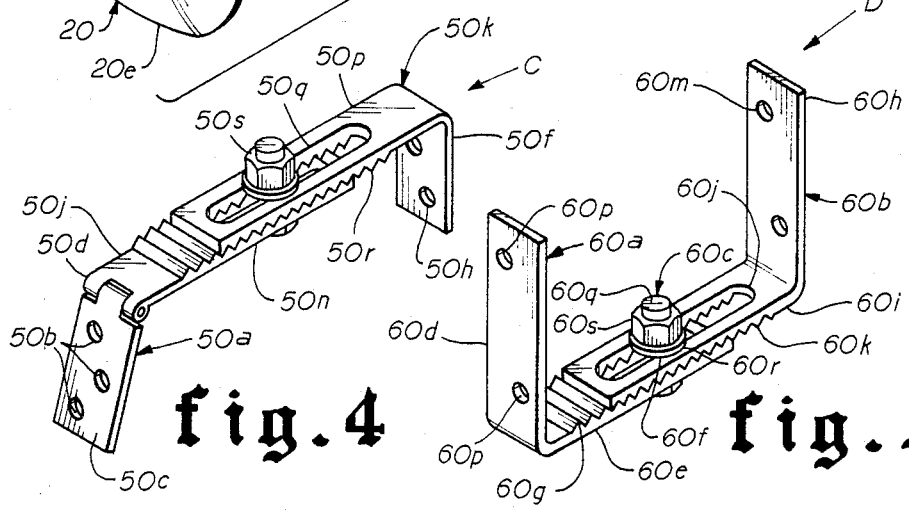
FIG. 4 is an isometric view of an embodiment of the support assembly of the system of the present invention using an upper bracket to secure the mirror to the back of the bus.
FIG. 5 is an isometric view of a portion of an embodiment of a system according to the present invention using a bracket near the bottom of the mirror to secure the mirror to the back of the bus.

Backing support member 30 is mounted to the rear wall 10*j* of bus B by mounting brackets C and D. As seen in FIG. 4, each mounting bracket C has a mounting flange 50*a*. Mounting flange 50*a* has a plurality of openings 50*b* which are adapted to receive fasteners (not shown) to secure surface 50*c* against the back 30*e* of backing support member 30. Any suitable fasteners, such as studs extending from back surface 30*e* may be used to accept mounting flange 50*a* by passing through openings 50*b*. A nut (not shown) can then be threaded onto the studs to finally secure mounting flange 50*a* to the back 30*c* of backing support member 30. In the alternative, mounting flange 50*a* may be permanently affixed to backing support member 30 with a suitable adhesive, by welding, or other suitable conventional means.

Figure 3:
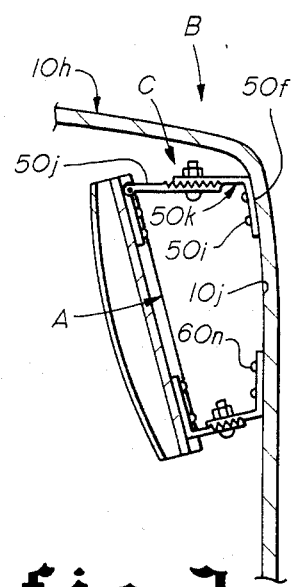
FIG. 3 is a detailed view of a portion of the support assembly of the system of the present invention including upper brackets having adjustable length.

Mounting flange 50*a* of mounting bracket C has a hinge 50*d* located at one end. A strut 50*e* (FIG. 2) is pivotally mounted to mounting flange 50*a* via hinge 50*d*. Strut 50*e* has an L-shaped cross-section with mounting surface 50*f* disposed at the opposite end of strut 50*e* from the hinged connection at 50*d*. As seen in FIGS. 3 and 4, mounting surface 50*f* is disposed in a plane substantially perpendicular to segment 50*g* of strut 50*e*. As seen in FIG. 3, mounting surface 50*f* need not be flat. It is preferred, that mounting surface 50*f* be adapted to the contour of rear wall 10*j* so that it may be mounted flush against rear wall 10*j*. The flush mounting, even against a curved rear wall 10*j*, eliminates relative vibration between mounting brackets C and rear wall 10*j*. Mounting surface 50*f* has several openings 50*h* through which a fastener 50*i* (FIG. 3) may be installed to secure mounting bracket C to the rear wall 10*j* of the bus B.

It is understood that depending on the internal dimensions of the bus B adjacent the point where mounting brackets C are attached to the rear wall 10*j*, various struts 50*e* (FIG. 2) having different length segments 50*g* may be interchangeably employed in order to position mirror 20 at the proper angle to allow driver 10*g* to observe the occupants 10*c* in the rear of the bus B. Alternatively, (FIG. 4) segment 50*g* may be constructed from two overlapping elements: an adjustment member 50*j* and a securing member 50*k*. Adjustment member 50*j* is substantially flat and connected at one end to mounting flange 50*a* via hinge 50*d*. Adjustment member 50*j* has a serrated surface 50*m* and a bore 50*n* extending therethrough. Securing member 50k is substantially L-shaped and includes mounting surface 50f on one end. Segment 50p of securing member 50k is formed having a slot 50q therethrough. Securing member 50k has a serrated surface 50r on segment 50p. A fastener 50s holds serrated surface 50r to serrated surface 50m selectively in different positions thereby allowing adjustment in mounting bracket C. As seen in FIG. 4, fastener 50s extends through bore 50n in adjustment member 50j as well as slot 50q in segment 50p. As seen in FIG. 3, fastener 50s can be used to lengthen or shorten mounting bracket C to allow the driver 10g to view the occupants 10c in the rear 10h of the bus B. As with the embodiment of mounting bracket C shown in FIG. 2, mounting surface 50f of securing member 50k shown in the embodiment of bracket C in FIG. 4 is secured to the rear wall 10j of bus B. Whether mounting bracket C is adjustable as shown in FIG. 3 or of fixed length as shown in FIG. 2 it is preferred that mounting surface 50f be formed to the contour of rear wall 10j of bus B to further reduce vibration therebetween.

Referring now to FIG. 5, mounting bracket D comprises a backing member strut 60a, a securing strut 60b and securing means 60c. Backing member strut 60a has a mounting segment 60d and an adjustment segment 60e. Adjustment segment 60e is disposed in a plane substantially perpendicular to mounting segment 60d. Backing member strut 60a has a bore 60f through adjustment segment 60e. Finally, backing member strut 60a has a serrated surface 60g on one surface of adjustment segment 60e.

Securing strut 60b has a mounting segment 60h and an adjustment segment 60i. Adjustment segment 60i has an elongated slot 60j whose longitudinal axis is parallel to the longitudinal axis of adjustment segment 60i. Securing strut 60b has a serrated surface 60k on adjustment segment 60i. A plurality of openings 60m are disposed on mounting segment 60h so that fasteners 60n (FIG. 3) can be used to mount strut 60b to the rear wall 10j of bus B.

Strut 60a has a plurality of openings 60p which can be employed in conjunction with fasteners to secure strut 60a to backing support member 30. It is understood that strut 60a and strut 60b can be attached respectively to backing support member 30 and rear wall 10j of bus B by any other suitable means such as adhesives or welding without departing from the spirit of the invention.

In order to mount mirror 20 to the rear wall 10j of bus B, the serrated surface 60k on adjustment segment 60i of securing strut 60b is overlayed on the serrated surface 60g on adjustment segment 60e of backing member strut 60a. Securing means 60c consists of a bolt 60q inserted through opening 60f and slot 60j. By using bolt 60q with lock washer 60r and nut 60s, serrated surfaces 60g and 60k can be held together in a variety of positions to aid in focusing the mirror 20 on the occupants 10c seated in the rear of the bus B. As seen in FIG. 5, mounting bracket D has substantially a U-shape when backing member strut 60a is fastened to securing strut 60b. In order to minimize vibration of the mirror 20, it is preferred that mounting segment 60h of securing strut 60b be flush mounted to the rear wall 10j of bus B. Typically, in order to achieve such flush mounting the angle between mounting segment 60h and adjustment segment 60i should be slightly greater than ninety degrees (FIG. 3).

As can readily be seen, the combination of the hinged connection 50d, and the length adjustment using adjustment member 50j and securing member 50k (FIG. 3) on mounting bracket C and the interaction between slot 60j and securing means 60c allows the mirror 20 to be moved toward or away from rear wall 10j of bus B at the top or at the bottom so that the mirror may be focused on occupants 10c seated in the rear 10h of the bus B.

In the preferred arrangement, a pair of mounting brackets C are fastened to backing support member 30 adjacent the juncture of edges 30c and 30b as well as the juncture between edges 30c and 30a. Additionally, a pair of mounting brackets D are fastened to backing support member 30 adjacent the juncture between edge 30b and edge 30d as well as the juncture between edge 30d and edge 30a. When so disposed on backing support member 30, and in combination with attachment means A, mirror 20 can be mounted over a rear exit door 10i so that it is focused on occupants 10c seated in the rear 10h of bus B and is uneffected by vibrations in the structural frame of bus B. of bus B. Mirror 20 is mounted over rear exit door 10i such that edges 20d and 20e are disposed in a parallel relationship to the top of exit door 10i. Frequently, the clearance above exit door 10i is at a minimum making it difficult to locate convex mirrors above the rear exit door 10i without having the mirror protrude into the door opening. Consequently, the mirror 20 of the present invention has a reduced dimension between edges 20d and 20e which allows the mirror 20 to fit above rear door 10i while at the same time, due to the larger dimension between edges 20b and 20c, still allow the driver unhindered view of the occupants 10c in the rear of bus B.

A second mirror 70 mounted over the driver's head at the front of the bus B can be positioned so that the driver may view the occupants 10c in the rear of bus B using mirror 20 without turning his head. Mirror 70 has a flat reflective surface 70a and can be mounted using mounting brackets C and D as described hereinabove.

The foregoing disclosure and description of the invention are illustrative and explanatory thereof, and various changes in the size, shape and materials, as well as in the details of the illustrated construction may be made without departing from the spirit of the invention.

I claim:

1. A rear viewing system for allowing a driver to view occupants seated near the rear of a bus, the bus having a rear exit door and interior walls subject to vibration transmitted from an engine comprising:
   a mirror;
   a backing support member;
   attachment means with said mirror and said backing support member for resiliently securing said mirror to said backing support member;
   a first mounting bracket further comprising:
      a mounting flange, said mounting flange secured to said backing support member;
      an L-shaped strut pivotally connected at one end to said mounting flange, and having a mounting surface at its end opposite said pivotal connection, said mounting surface adapted to be mounted to an interior wall at the rear of the bus; and
   a second mounting bracket further comprising;
      a backing member strut having a mounting segment secured to said backing support member and an adjustment segment disposed substantially perpendicularly to said mounting segment, said adjustment segment formed having an opening therethrough;

a securing strut, having a mounting segment secured to the rear of the bus and an adjustment segment, said adjustment segment of said securing strut formed having an opening; and securing means with said opening in said adjustment segment of said securing strut and said opening in said adjustment segment of said backing member strut for selectively retaining said backing member and securing struts to each other in different positions and thereby facilitating adjustment of the position of said mirror.

2. The rear viewing system of claim 1 wherein said mounting surface of said strut of said first mounting bracket is adapted to fit the contour of the rear interior wall of the bus.

3. The rear viewing system of claim 2 wherein:

said adjustment segment of said backing member strut further includes a serrated surface;

said adjustment segment or said securing strut further includes a serrated surface; and said securing means retains the serrated surface on said back member against the serrated surface on said securing strut to allow said mirror to be selectively mounted in several positions and resist movement out of adjustment due to vibration of the rear of the bus when the bus is moving.

4. The rear viewing system of claim 3 wherein said strut of said first mounting bracket further comprises:

an adjustment member pivotally connected to said mounting flange and having an opening therethrough;

a securing member having an opening therethrough, and adjustment means with said openings in said adjustment member and said securing member for selectively retaining said adjustment and securing members together in different positions thereby allowing said mirror to be focused on the occupants in the rear of the bus.

5. The rear viewing system of claim 4 wherein:

said adjustment member of said strut on said first mounting bracket has a serrated surface;

said securing member of said strut of said first bracket has a serrated surface; and said adjustment means retains said serrated surfaces of said adjustment and securing members of said strut together in selectively different positions thereby allowing said mirror to be focused on the occupants seated adjacent the rear of the bus and further resisting movement out of adjustment of said mirror due to vibration of the rear of the bus when the bus is moving.

6. The rear viewing system of claim 5 wherein:

said mirror has a convex reflective surface.

7. The rear viewing of claim 6 wherein said attachment means further comprises:

a resilient channel member formed having an elongated groove; and said mirror and said backing support member have substantially the same peripheral dimensions and both said mirror and backing support member having an end extending into said groove.

8. The rear viewing system of claim 7 wherein said resilient channel member is formed from sheet metal.

9. The rear viewing system of claim 7 wherein said resilient channel member is formed having a rubber interior component adapted to receive said mirror and said backing support member and a sheet metal component overlying and substantially enclosing said rubber interior component.

10. The rear viewing system of claim 7 wherein said mirror and said backing support member are formed having a pair of opposing arcuate edges; and a pair of opposing straight edges.

11. The rear viewing system of claim 10 wherein:

the distance between said opposing arcuate edges of said mirror is greater than the distance between said straight edges of said mirror.

12. The rear viewing system of claim 11 wherein:

two first mounting brackets are attached to said backing support member at a spaced relation to each other, each disposed adjacent a juncture of one of said arcuate edges and one of said straight edges of said backing support member; and two second mounting brackets are attached to said backing support member at a spaced relation to each other and from said first mounting brackets, said second mounting brackets each disposed adjacent a juncture of said arcuate and straight edges of said backing support member.

13. The rear viewing system of claim 12 further including:

a second mirror mounted in the front of the bus, near the driver and adapted to permit the driver to observe said mirror mounted in the rear of the bus without turning his head.

* * * * *